(12) United States Patent
Bliek et al.

(10) Patent No.: US 6,688,491 B2
(45) Date of Patent: Feb. 10, 2004

(54) OBJECT DISPENSING APPARATUS

(75) Inventors: David Edward Bliek, Chattanooga, TN (US); Grant Duane Beasley, Ringgold, GA (US)

(73) Assignee: PSI Packaging Inc., Rossville, GA (US)

( * ) Notice: Subject to any disclaimer, the term of this patent is extended or adjusted under 35 U.S.C. 154(b) by 18 days.

(21) Appl. No.: 10/099,728

(22) Filed: Mar. 15, 2002

(65) Prior Publication Data

US 2003/0173373 A1 Sep. 18, 2003

(51) Int. Cl.⁷ .................................................. B65H 5/00
(52) U.S. Cl. ....................................... 221/238; 221/289
(58) Field of Search ........................... 221/7, 9, 13, 92, 221/129, 224, 236, 238, 289, 298

(56) References Cited

U.S. PATENT DOCUMENTS 6,523,330 B1 * 2/2003 Hurd ............................ 53/405

* cited by examiner

Primary Examiner—Kenneth W. Noland
(74) Attorney, Agent, or Firm—Jason A. Bernstein; Powell, Goldstein, Frazer and Murphy LLP

(57) ABSTRACT

An apparatus for controlled dispensing of a plurality of objects, the apparatus comprising a housing and frame assembly, a track assembly comprising a pair of parallel spaced apart tracks shaped in a convoluted closed loop shape to optimize space and volume, and a plurality of tubes disposed within the track assembly and able to move within the tracks. A dispensing assembly has a pneumatic ram for ejecting an object placed in the tube, and an indexing assembly for advancing the tube after ejection of its object. A ratchet assembly permits one directional movement of the tubes and prevents tubes from moving backward to the dispensing assembly. At least one assist advancing assembly has a pneumatic ram for pushing the tubes within the track in one direction. Photosensors used in conjunction with a microprocessor controller enable the apparatus to detect low object load, speed and system error. A user display provides for control of the apparatus.

2 Claims, 18 Drawing Sheets

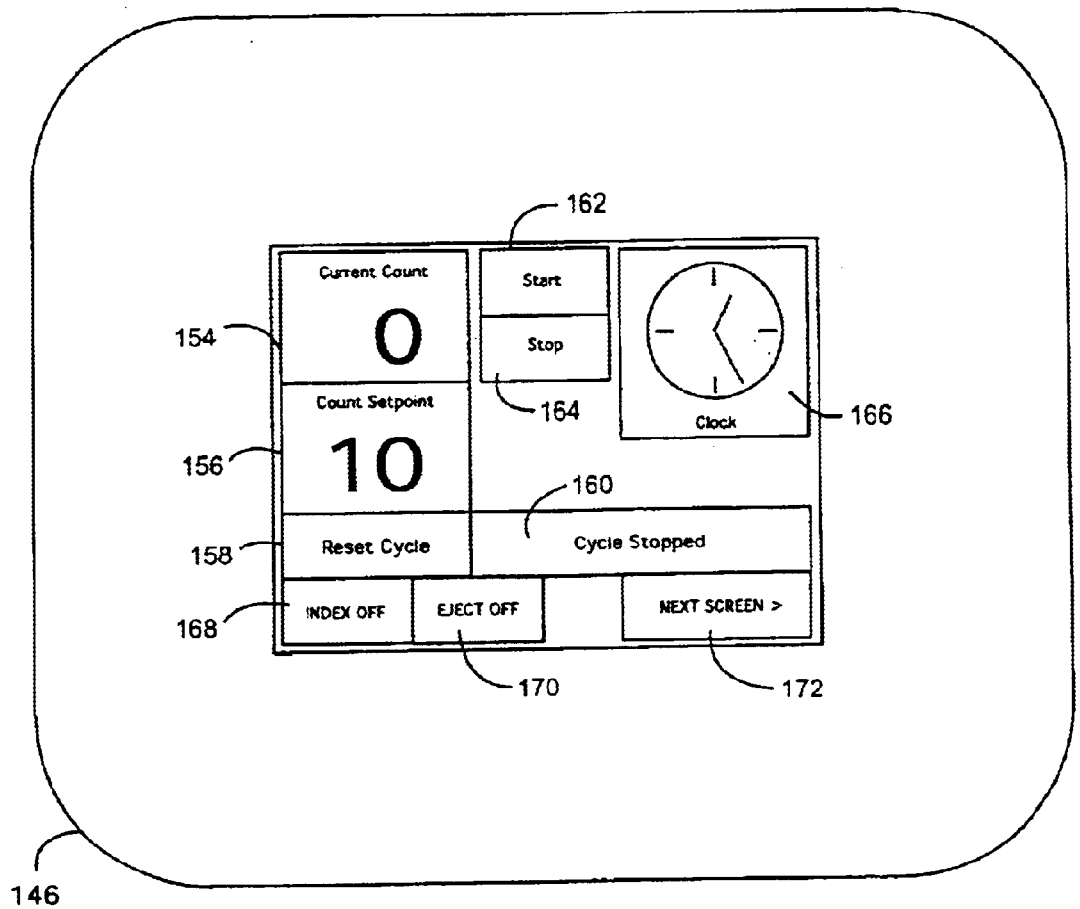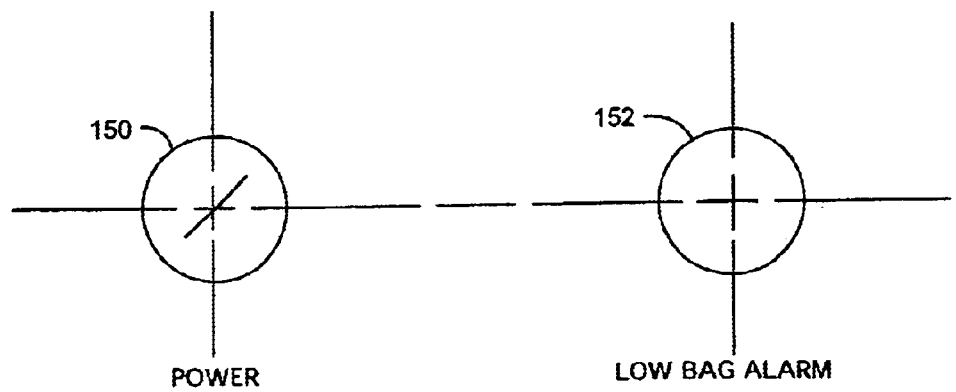
FIG. 11

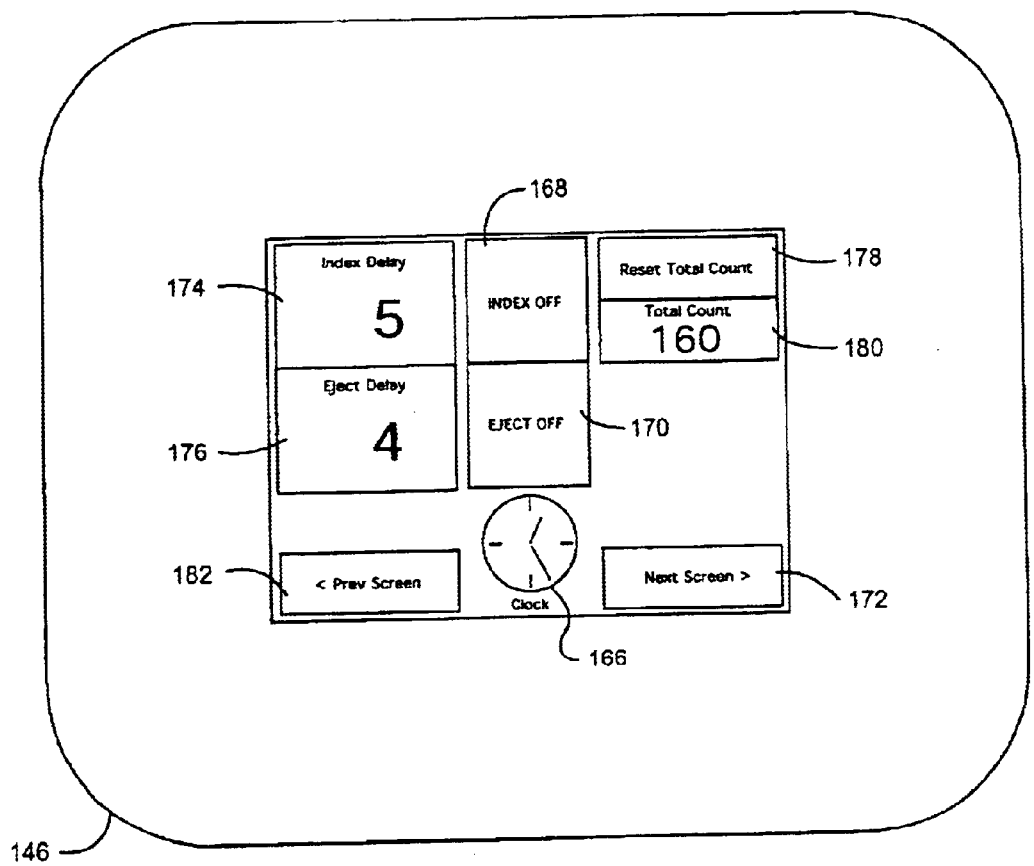
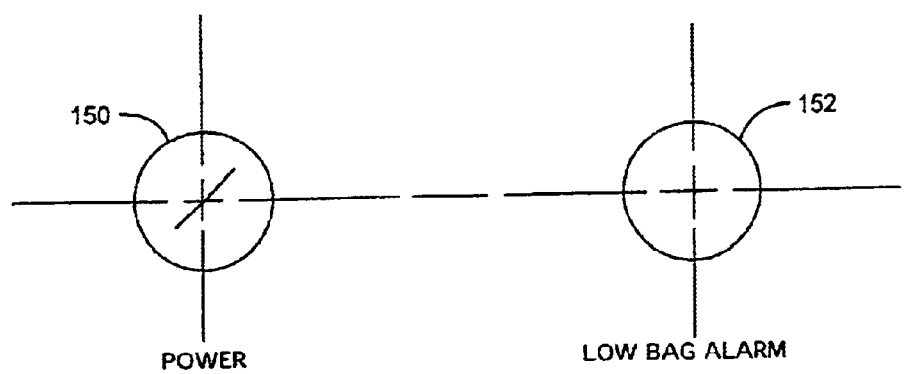
FIG. 12

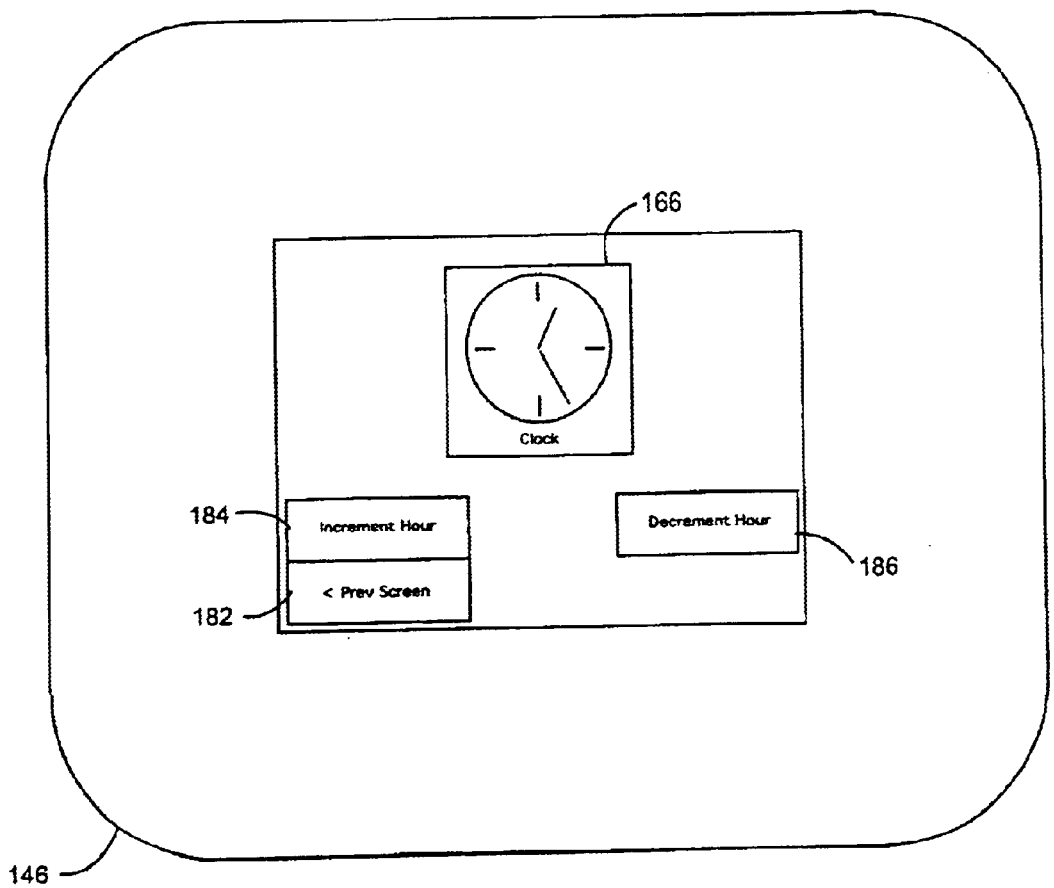
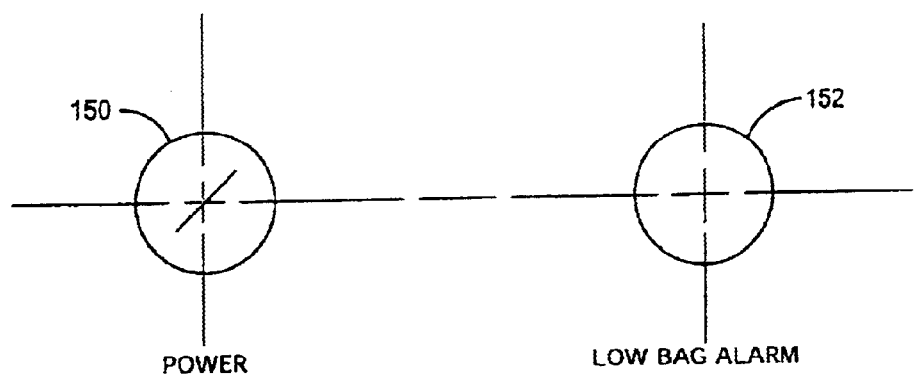
FIG. 13

OBJECT DISPENSING APPARATUS

FIELD OF THE INVENTION

The present invention relates to apparatus for dispensing a plurality of similarly sized cylindrical objects from a conveyed set of holding tubes to a particular location.

BACKGROUND OF THE INVENTION

The use of synthetic fibers for reinforcement in concrete is known in the art. For several years, fibers have been placed in disintegrating paper bags for easy disbursement into ready mix concrete trucks and central concrete mixers. Typically, the fibers are packaged in these paper bags because they allow for rapid distribution of the fibers. An example of a fiber packing apparatus is disclosed in co-pending U.S. patent application Ser. No. 09/551,183, filed Apr. 17, 2000, entitled APPARATUS AND METHOD AND FOR PACKAGING FIBERS AND ARTICLE PRODUCED BY SAME and commonly assigned to the owner of the present invention. The fibers must be added in controlled amounts over a controlled period of time during the mixing process to ensure smooth and complete mixing. Improvements have been made in reducing the amount of paper required to contain the fibers but no efficient means has been developed to automatically and controllably dispense the product into a truck or central mixer. Various methods have been attempted but have not proven to be successful. The problems associated with these systems include small capacities, slow operation, inaccurate weighing and overall expense.

A screw type system holds few bags and operates like a candy vending machine. A screw type system holds a limited number of bags, is slow and not very efficient. It requires a great deal of room and moves slowly to avoid tearing the bags.

A weight loss system continuously weighs a volume of material contained in a hopper and dispenses the required amount of fibers to be blown into the truck or central mixer. In a weight loss system, the major problem has been the cost of the unit. The equipment required, scales, etc., are very expensive and not well suited for the dusty environment of a ready mix concrete operation. It would be desirable to have a system with vessels that would hold the pre-weighed bags of fiber and dispenses the required number of bags to meet the batching requirements.

A sausage-like system utilizes bags that are all continuously connected together. They are rolled up and placed in large boxes for storage. As the bags are pulled from the box, they are cut off and dropped onto a conveyor which feeds the truck or central mixer With sausage-like packaging systems it is very difficult if not impossible to efficiently and economically produce and package a bag that can be filled and handled. If the system breaks down, it would require conventional packaging to be used until it is repaired. This would require stocking several put-ups of the same product.

It would be desirable to have an individual closed loop track unit capable of holding individual tubes that are capable of holding said bags of fibers, counting the fiber bags and dispensing them onto a conveyor or into a blower for final dispersion into a mixer.

SUMMARY OF THE INVENTION

The present invention provides an apparatus for dispensing objects, each object contained in a transport tube, comprising: a housing comprising a frame; a track assembly for holding a plurality of tubes; a dispensing assembly, comprising a first ram for pushing one the object from the tube, a second ram for moving one the tube from a first position to a second position while preventing other tubes from interfering with the moving; indexing assembly for controllably permitting one tube at a time to move in response to movement from the second ram; and, a controller for controlling the dispensing assembly.

More particularly, the present invention provides, an apparatus for dispensing objects, each object contained in a transport tube, comprising a housing comprising a frame and a rollup access panel; a track assembly for holding a plurality of tubes, the track assembly comprising a pair of parallel spaced apart lengths of a rigid material arranged in a convoluted space; a dispensing assembly, comprising a first ram for pushing one the object from the tube, the ram having a distal end terminating in a disk associated therewith, a first powered cylinder for actuating the first ram, an advancing assembly for controllably permitting one tube at a time to advance to the dispensing assembly, comprising, a second ram having a distal end terminating in a curved section for holding a tube for moving one the tube from a first position to a second position along the track assembly; a generally flat horizontal plate associated and reciprocating with the first ram for preventing tubes disposed above the dispensing assembly from prematurely entering the dispensing assembly when the first ram is extending; a second powered cylinder for actuating the second ram, an indexing assembly for preventing movement of the tubes in a reverse direction, comprising, a first arm having a curved portion for releasably engaging a portion of a tube, a second arm having a curved portion for releasably engaging a portion of a tube, a rod connecting and maintaining the first and second arms in a generally parallel spaced apart relationship, at least one rod in which the sleeve is rotatingly disposed, the rod associated with the frame; at least one tube advancing assembly comprising a third ram, a third powered cylinder, a rocker bar having at least one third arm having a curved portion for releasably engaging a portion of a tube, a sleeve in which the rocker bar is at least partially disposed and a trough associated with the track assembly in which the rocker bar can reciprocatingly translate, means for controlling the dispensing assembly comprising a microprocessor; and, at least one sensor for detecting the presence of at least one of the objects.

In one embodiment the present invention incorporates a large number of tube sections manufactured from economical PVC pipe that are contained in a continuous track assembly. The bags are placed inside the tubes. The tubes are indexed forward by an air cylinder to a point where they can be discharges by another ram. At this point, the bags are discharged onto a conveyor, into the vortex of an air operated blower dispenser or other transport mechanism to deliver the fibers to their final destination. This allows for a very efficient utilization of space and simplifies the delivery of the product. The general components of an embodiment of the apparatus comprise the tubes, track assembly, cylinder (ram) to eject the bags, cylinder (ram) to assist and advance the tubes forward, an independent control unit to operate the system and count the bags, a photoelectric eye to indicate low volumes and the framework and housing to contain the track assembly.

Other features and advantages of the present invention will become apparent upon reading the following detailed description of embodiments of the invention, when taken in conjunction with the appended claims.

BRIEF DESCRIPTION OF THE DRAWINGS

The invention is illustrated in the drawings in which like reference characters designate the same or similar parts throughout the figures of which:

FIGS. 11–13 are schematic views of the controller display screens and user interface.

DETAILED DESCRIPTION OF THE PREFERRED EMBODIMENTS

In general, the present invention provides an apparatus for the controlled dispensing of a plurality of objects, each object being removably disposable within a transport vessel. The apparatus is initially loaded by having one (or possibly more) objects placed inside each transport vessel. When the apparatus is activated the transport vessels incrementally move one at a time within a track toward a dispensing assembly which causes the object(s) to be ejected from its transport vessel. The object can be transported to a remote location by other conventional transport apparatus, such as, but not limited to, a conveyor. In one preferred embodiment of the present invention the objects are bags containing fibers, such as BulletPAC™ bags available from PSI Packaging, Inc., Chattanooga, Tenn. The BulletPAC™ bag allows for a given volume of fiber to be packaged into a smaller space which contributes to reducing the overall volume of product to be placed in the machine. The bags are dispensed in an electronically controlled manner (such as by the use of at least one timer, limit switch, photoelectric eye, combinations thereof and the like) and eventually conveyed to a concrete truck for mixing with other components.

Figure 1:
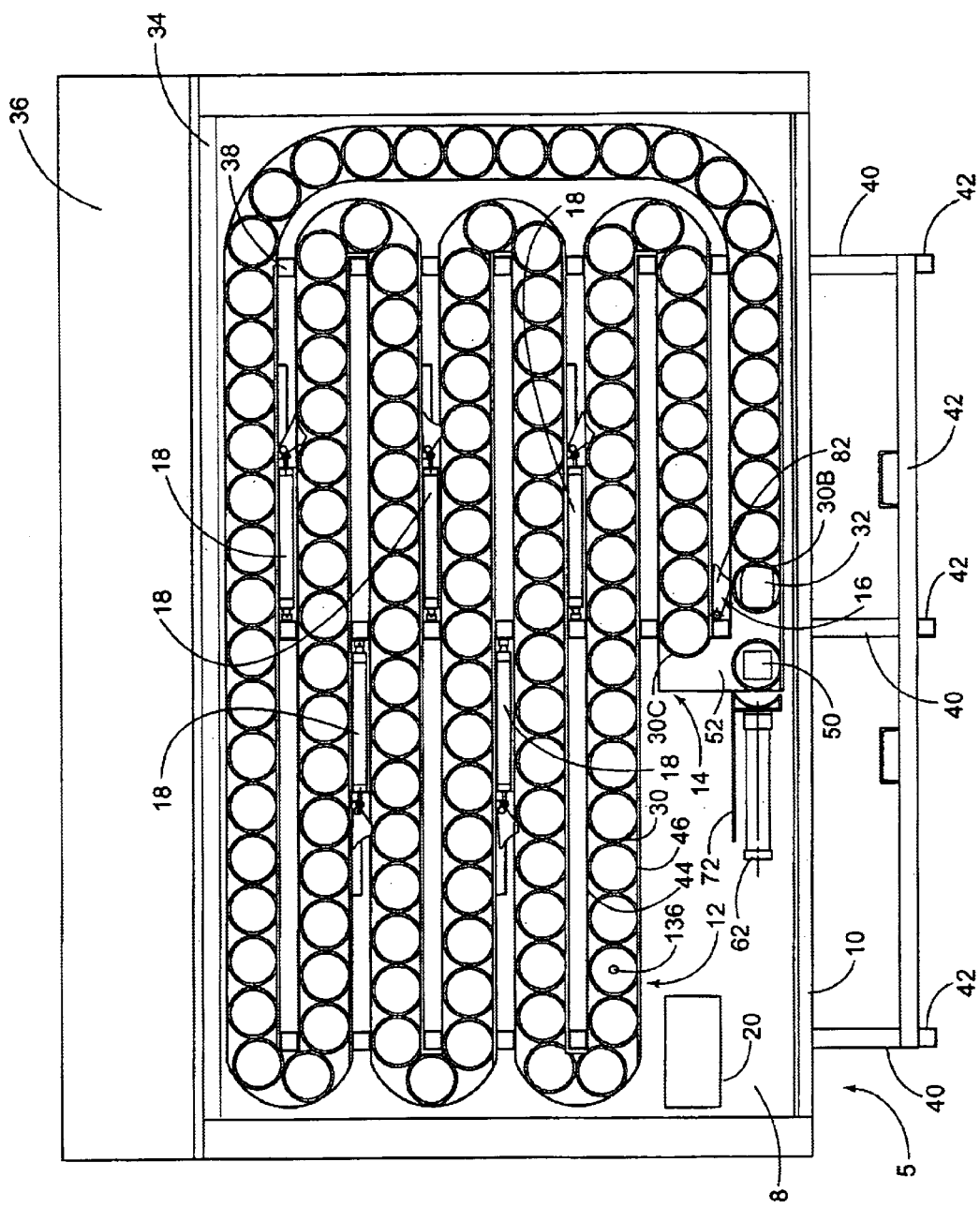
FIG. 1 is a front elevational view of a dispensing apparatus of a preferred embodiment of the present invention.

Referring to FIG. 1, a preferred embodiment of the present invention is shown in which an apparatus 5 of the present invention generally comprises a housing 8, a frame 10, a track assembly 12, a dispensing assembly 14, an indexing assembly 16, at least one advancing assembly 18, a controller 20, and preferably, though not mandatorily, at least one sensor 22. A plurality of transport vessels 30 each containing at least one object 32 is disposed within the track assembly 12.

The frame 10 is constructed of a generally rigid material, such as, but not limited to angle iron, steel, aluminum, ceramic, composite, wood, plastic, combinations thereof or other construction material known to those skilled in the art capable of supporting the components of the apparatus. The housing 8 may also include a roll up door 34 which can be extended downward from an enclosure 36 during operation to maintain safety, reduce noise and contaminant buildup. The frame 10 includes a number of horizontal support beams 38 to which is mounted the track assembly 12. The frame 10 also includes a support base comprising a set of legs 40 and cross braces 42. Other frame 10 components are not shown in the drawing, but are used to support and stabilize the apparatus 5.

The track assembly 12 comprises a first track 44 and a second track 46 which are maintained by the support beams 38 in a parallel spaced apart relationship. Each track 44 and 46 is preferably a length of right angle material (for example, angle iron). The tracks 44 and 46 can be constructed as a single piece of material or sections of material which are joined, such as by welding. FIG. 1 shows the track assembly 12 constructed in a closed loop with a number of convolutions so that the tubes 30 can move in an endless loop. It is desirable to design the track assembly 12 to optimize in a closed loop system a large number of tubes 30 held by the assembly to minimize space. Where space is less of a concern, other track assembly 12 design geometries can be used. Optionally, the inside surface of the track can be lined with a nonstick material, such as, but not limited to, TEFLON® tape to reduce friction. In an alternative embodiment, the tracks 44 and 46 can include a plurality of bearings, for example, ball bearings, mounted in or to the track to reduce friction.

The tubes 30 are designed to move with minimal friction within the track assembly 12. While cylindrical shaped tubes are preferable, other shapes could be used. The tubes can be constructed of a light weight rigid material, such as, but not limited to, PVC (polyvinylchloride), PET (polyethylene terephthalate), or other polymer or plastic, metal, or the like. The tubes 30 are sized to accommodate the size of the object 32 of interest to be dispensed. Thus, the tubes can be of any appropriate length with frame 10 and the distance between the tracks 44 and 46 being designed accordingly. The objects 32 are typically loaded into the tubes by hand. In a preferred embodiment the object 32 is a cylindrical bag of compressed fibers commonly used in the concrete production process. A large number of bags must be added to the concrete mix in a controlled manner throughout a substantial portion of the mixing process. It is also contemplated as being within the scope of the present invention for the tubes 30 to contain any other suitable object which can be dispensed. For example, and not by way of limitation, the present invention can be used to dispense bottles of beverages, rolled and tied hospital garments (such as in a hospital garment dispensing apparatus), machine components as part of an assembly line, and the like. It is also to be understood that the object 32 can be a plurality of objects that are dispensed simultaneously. The tubes 30 are sized to be long enough to fit within the track assembly 12 and move relatively freely within the tracks 44 and 46, but will be maintained within the tracks when moving around the curved portions. In the closed loop system there are sufficient tubes to substantially fill the space in the track assembly 12. The curved portion of the track where the tubes 30 change direction, is sized to permit the removal of a tube 30 such as if the tube 30 cracks or should the system become jammed. Optionally, there can be a small length of material that covers the recessed portion until the tube is to be removed. Optionally, the tubes 30 can be numbered, bar coded, color coded or have other unique identifying indicia included therewith where desired. As one tube 30 is advanced by the dispensing assembly and indexing assembly the other tubes 30 move along and within the track assembly 12 in the loop. Certain of the tubes 30 are further noted in FIG. 1 and distinguished for the purposes of discussion as a present tube 30A (i.e., currently in the dispensing assembly 14), last tube 30B (which has just been emptied of its object 32) and next tube 30C (the tube next to be emptied and located just above the present tube 30A). While tubes 30A, B and C are essentially identical, the differentiation in parts numbering is done to facilitate discussion of the relative positioning of the tubes to describe the movement of the tubes generally and the operation of the invention.

Figure 2:
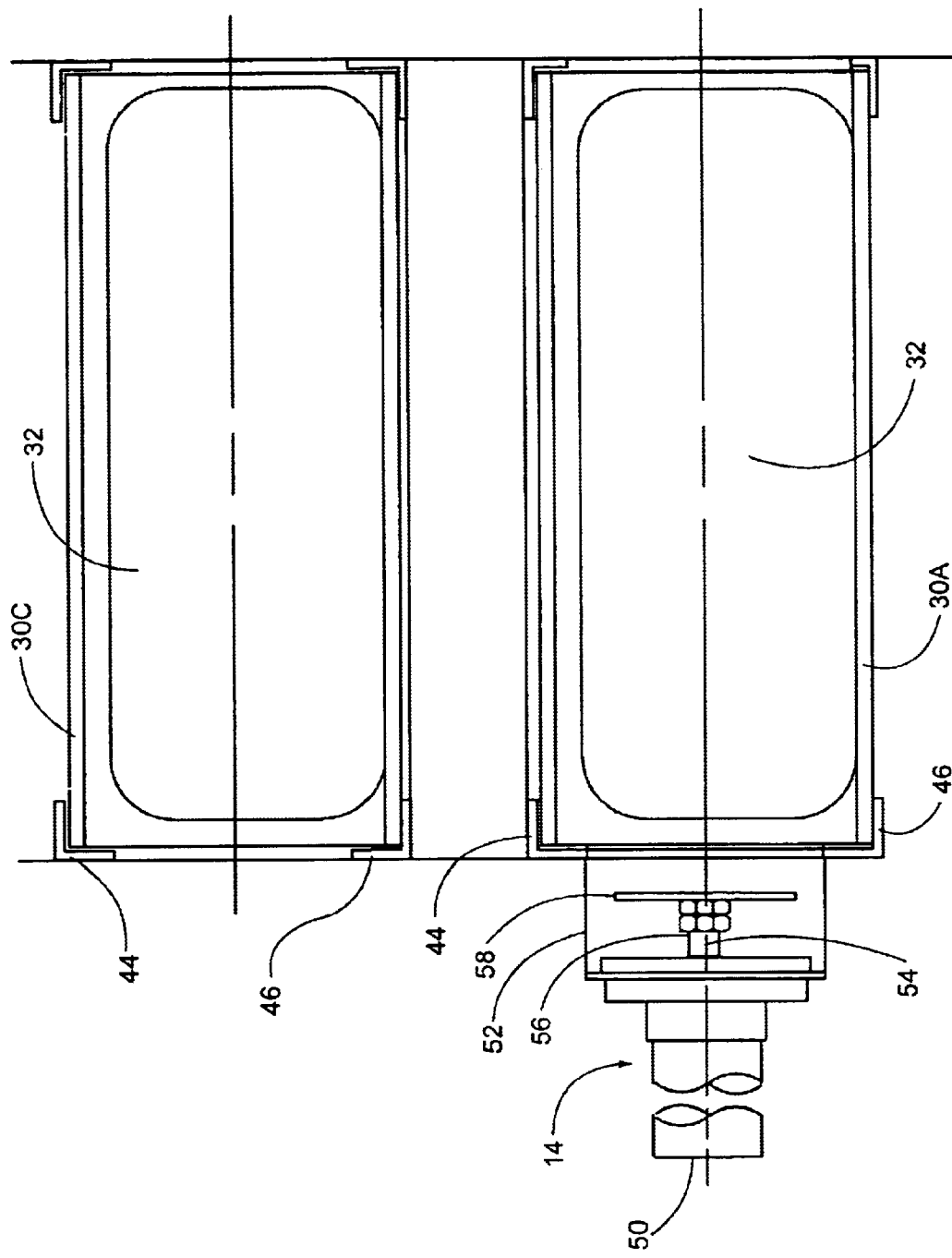
FIG. 2 is a side elevational view of the dispensing assembly with the ram retracted.
Figure 3:
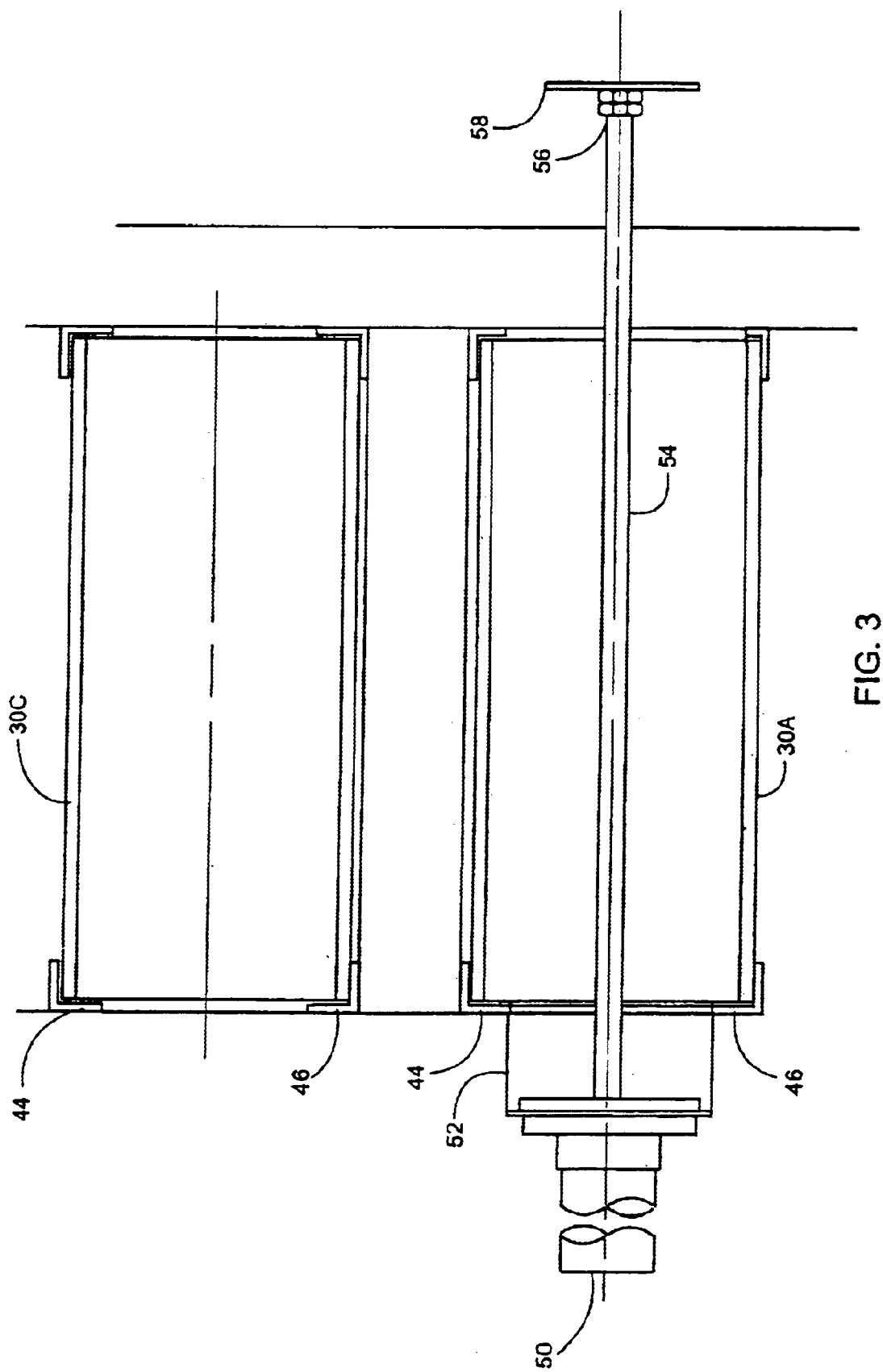
FIG. 3 is a elevational view of the dispensing assembly with the ram extended.

FIGS. 2 and 3 show the dispensing assembly 14, which generally comprises a powered pneumatic cylinder 50 powered by an air supply (not shown) attached to a housing 52, and which drives a ram 54. While the cylinders described herein are discussed as being pneumatic, it is to be understood that the cylinder could be hydraulic. The ram 54 has a distal end 56 to which is preferably, though not mandatorily, attached a generally flat disk 58. The housing 52 is attached to the frame 10 and can be supported by support bracket (not shown) for additional support. In a preferred embodiment the dispensing assembly 14 is mounted orthogonal to the frame 10 so that the ram 54 can reciprocatingly extend from outside of a tube 30 through the length of the tube 30. It is preferable that the ram 54 extend beyond the length of the tube 30 so that when dispensing the object 32 in the tube 30 the object 32 is fully pushed out of the tube 30. FIG. 2 shows the ram 54 in the retracted backward stroke position and the object 32 in the tube 30. FIG. 3 shows the ram in the extended forward stroke position. As a tube 30 is moved into axial alignment with the ram 54, the pneumatic cylinder 50 is actuated and the ram 54 extends through the tube 30, ejecting the object 32. The pneumatic cylinder 50 is then actuated to reverse the stroke and the ram 54 is retracted back through the tube 30. The control of the cylinder 50 will be discussed in greater detail hereinbelow in conjunction with the controller 20.

In an alternative embodiment the ram 54 is a flexible shaft reciprocatingly contained within a curved sleeve and mounted to the frame in a parallel relationship. This configuration would minimize the degree to which the dispensing assembly 14 extends outward from the housing 8.

Figure 4:
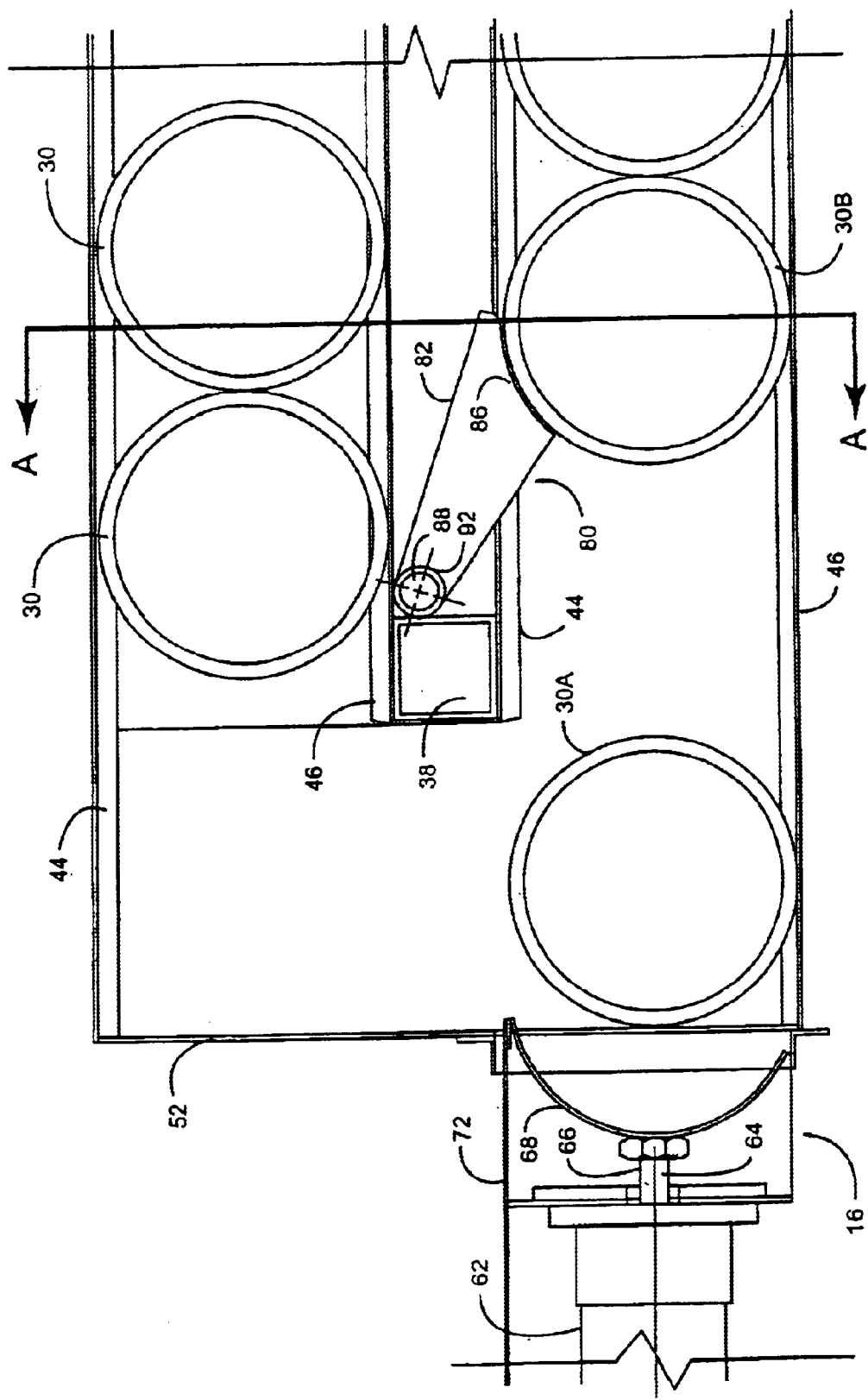
FIG. 4 is a side elevational view of a detail of the dispensing assembly, indexing assembly and ratchet assembly with the dispensing assembly ram retracted and the indexing fingers in the down position.
Figure 4A:
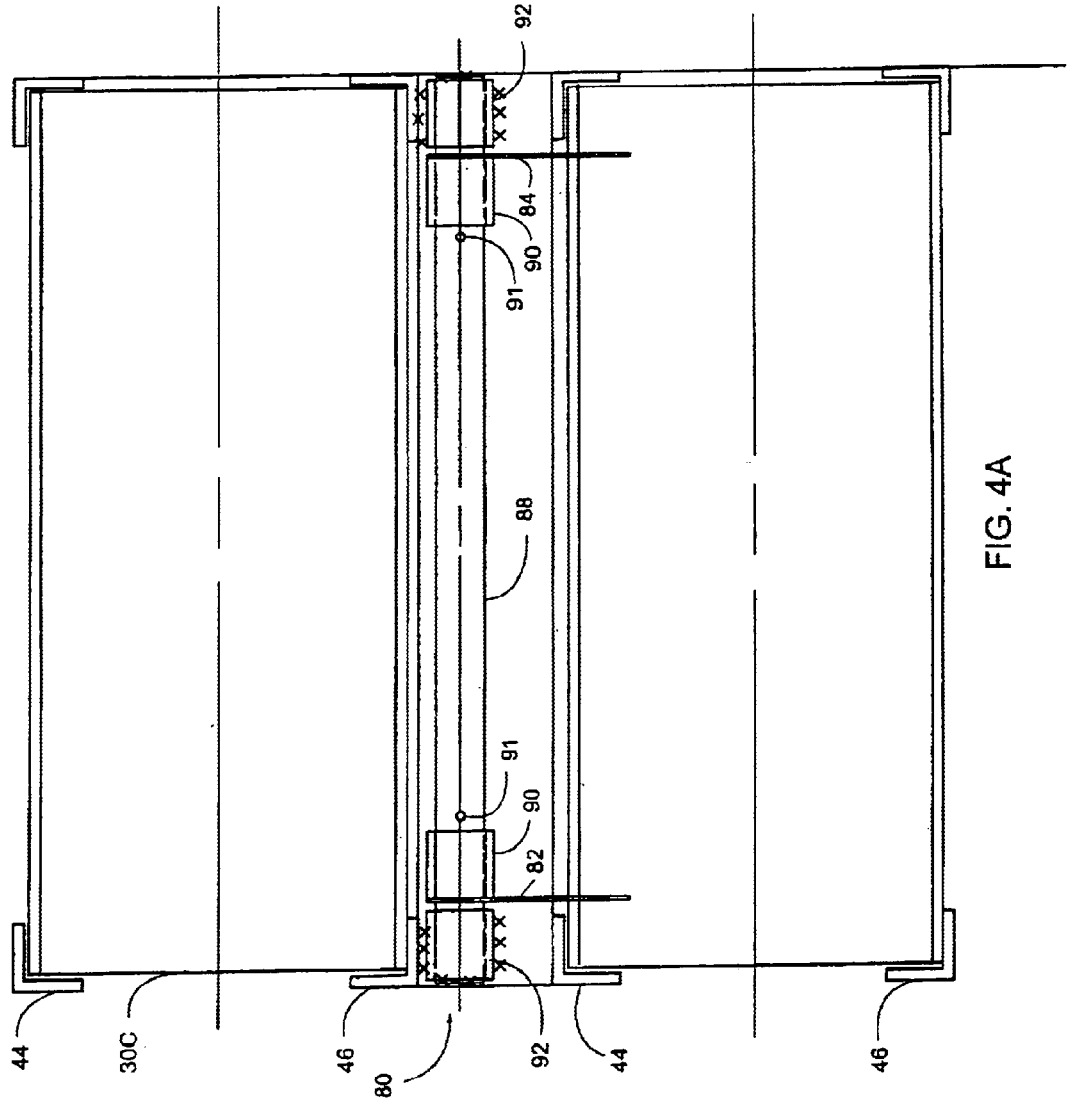
FIG. 4A is a front elevational view of the detail of the dispensing assembly taken long line A—A.
Figure 5:
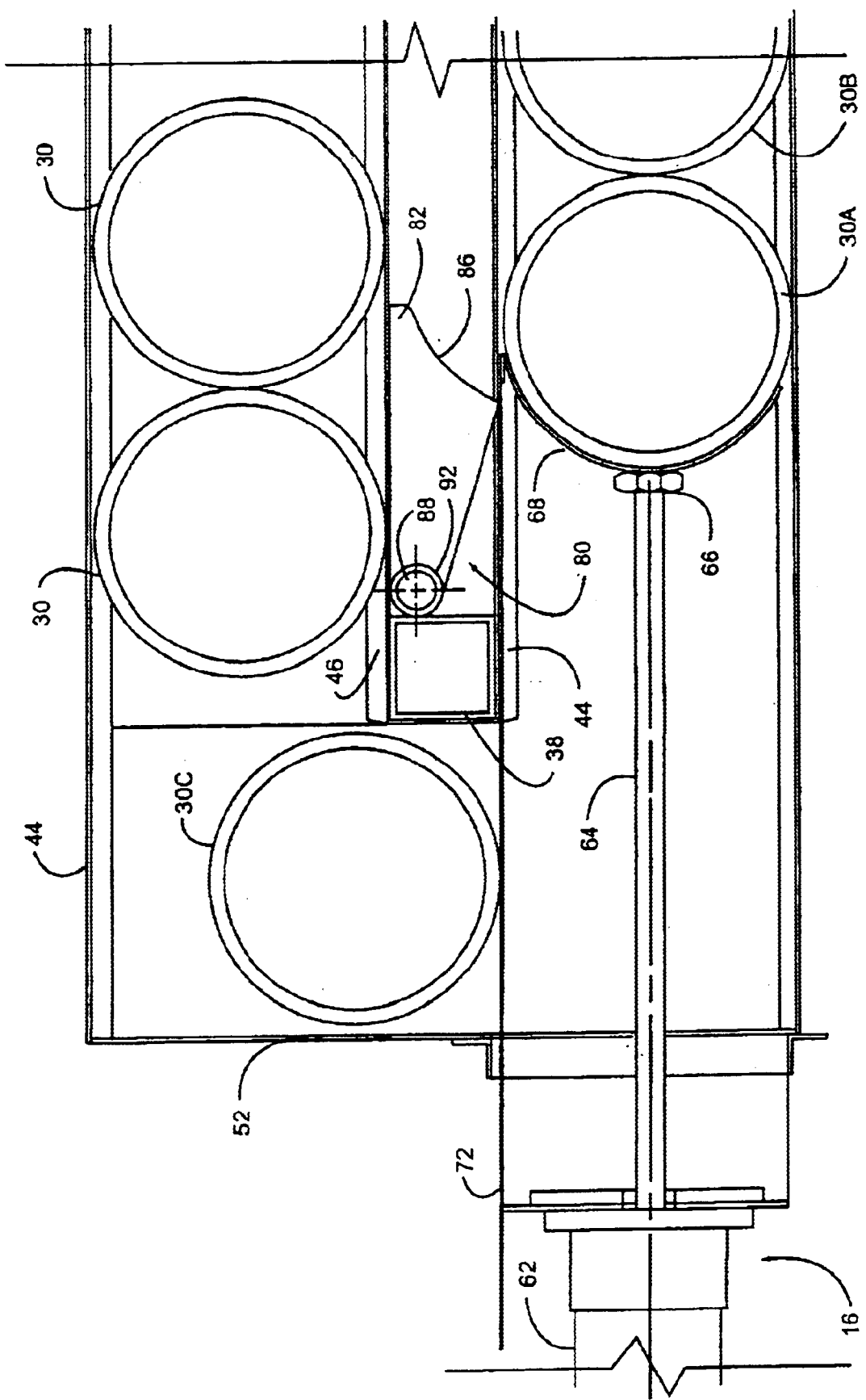
FIG. 5 is a side elevational view of a detail of the dispensing assembly and ratchet assembly with the dispensing assembly ram extended and the indexing fingers in the up position.
Figure 6:
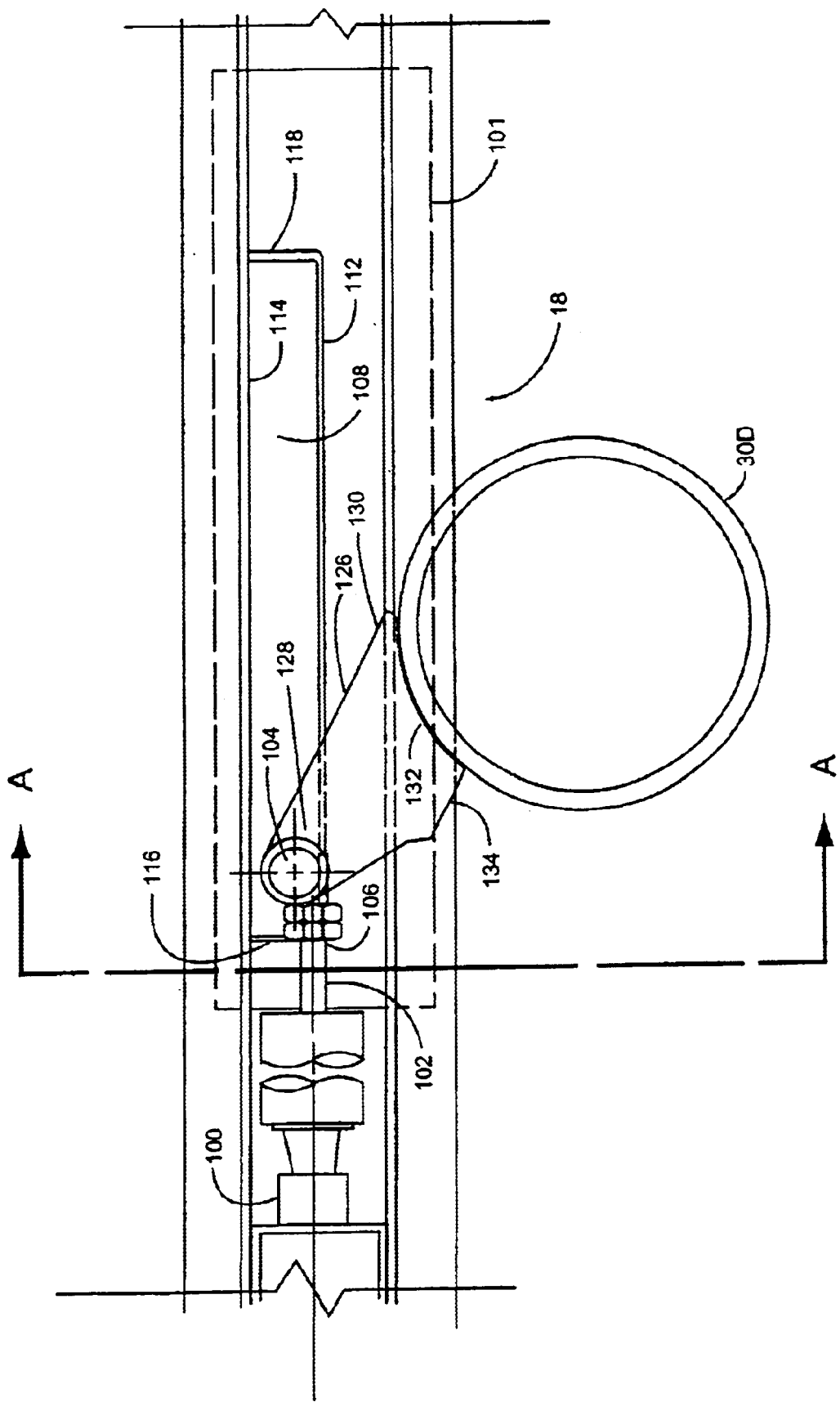
FIG. 6 is a side elevational view of the advancing assembly.

FIGS. 4, 4A and 5 show details of the indexing assembly 16, which comprises a pneumatic cylinder 62 attached to the frame 10 and a ram 64 having a distal end 66. A curved scoop 68 is attached to the distal end 66 of the ram 64. The curved scoop 68 is designed to conform generally to the curve of the tube 30. A generally flat plate 72 is associated with the scoop 68. The plate 72 reciprocates with the ram 64. As the ram 64 extends the scoop 68 (FIG. 5) the plate moves as well to block a tube 30C from falling into the dispensing assembly prematurely. Further discussion of the operation appears hereinbelow.

A ratchet assembly 80 comprises at least one and, in one embodiment of the invention, a pair of parallel spaced apart fingers 82 and 84, each of which may, though not mandatorily, have a concave curved area 86 shaped to conform generally to the curve of the tube 30. Other shaped surfaces or sections are contemplated as being part of the present invention. One end of each finger 82 and 84 is attached to at least one sleeve 90. The sleeves 90 are slidingly fitted around a bar 88, and prevented from sliding inward toward the center by a pin, ring or other protrusion 91. The bar 88 is preferably attached (such as by welding or gluing) at each end to a spacer collar 92 which is associated with a support beam 38 or other part of the frame 10. Alternatively, the bar 88 can be lathed or otherwise formed to have an increased diameter area proximate to each end to and attached directly to the frame 10 without the need for a spacer collar. The sleeve 90 can rotate around the bar 88 and the fingers 82, 84 can pivot up and down. As will be described in greater detail hereinbelow, as the tube 30A is pushed by the ram 64 from the dispensing assembly 14 along the track assembly 12, a next tube 30C is ready to drop by gravity into the dispensing assembly 14. The plate 72 blocks the tube 30C from dropping until the present tube 30A (now last tube 30B) is moved and ram 64 has returned to its withdrawn position. The ratchet assembly 80 pivots upward when the ram 64 extends and pushes the present tube 30A (to the right as shown in FIG. 4) and as the ram 64 and plate 72 are retracted the fingers 82, 84 pivot downward and the curved area 86 engages a portion of a just dispensed tube (now considered past tube 30B). The ratchet assembly 80 prevents the tubes 30 from pushing backward toward the dispensing assembly 14 and provides a clear area for the next tube 30C to drop.

Figure 7:
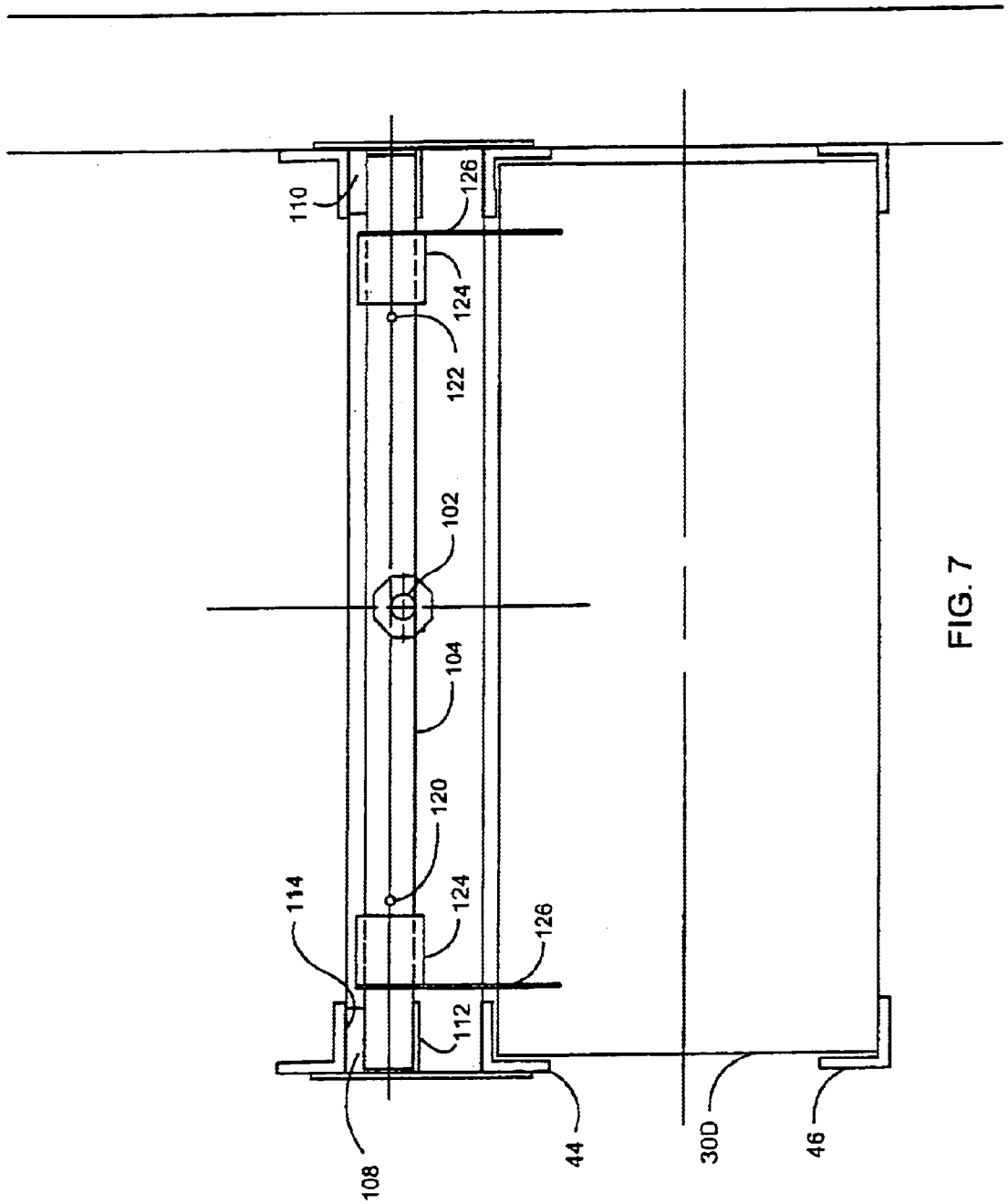
FIG. 7 is a front elevational view of the advancing assembly taken along line A—A.

FIGS. 6–10 show an advancing assembly 18, which is preferably, though not mandatorily utilized. In a preferred embodiment a plurality of advancing assemblies 18 are utilized. The advancing assembly 18 comprises a pneumatic cylinder 100 associated with the track assembly 12 by a mounting plate 101 and a ram 102 having attached at the distal end 106 a bridge rod 104. As shown in FIG. 7, the bridge rod 104 is long enough to fit between the tracks 44 and 46 and rests on a pair of parallel spaced apart troughs 108 and 110. Each trough comprises a horizontal lower section 112, a parallel upper section 114 created by the underside of the upper first track 44, a first vertical stop section 116 and a second vertical stop section 118. The bridge rod 104 can slide on the lower section 116 within each trough 108 and 110. In a preferred embodiment the bridge rod 104 also preferably has a pair of spaced apart retaining protrusions 120, 122. The protrusions can be an annular ring, pin, or other physical device for preventing movement along the rod of a sleeve 124 beyond a desired distance. At least one sleeve 124 fits around the bridge rod 104 so that sleeve 124 can rotate about the bridge rod 104. A finger 126 having a proximal end 128 attached to the sleeve 124 also has a distal portion 130 having a curved section 132, the curve being sized to generally match the curvature of the tube 30, and a bottom section 134. In a preferred embodiment two sleeve 124 and finger 126 combinations are used. It is to be understood that one or more sleeve 124 and finger 126 combinations can be used.

Figure 8:
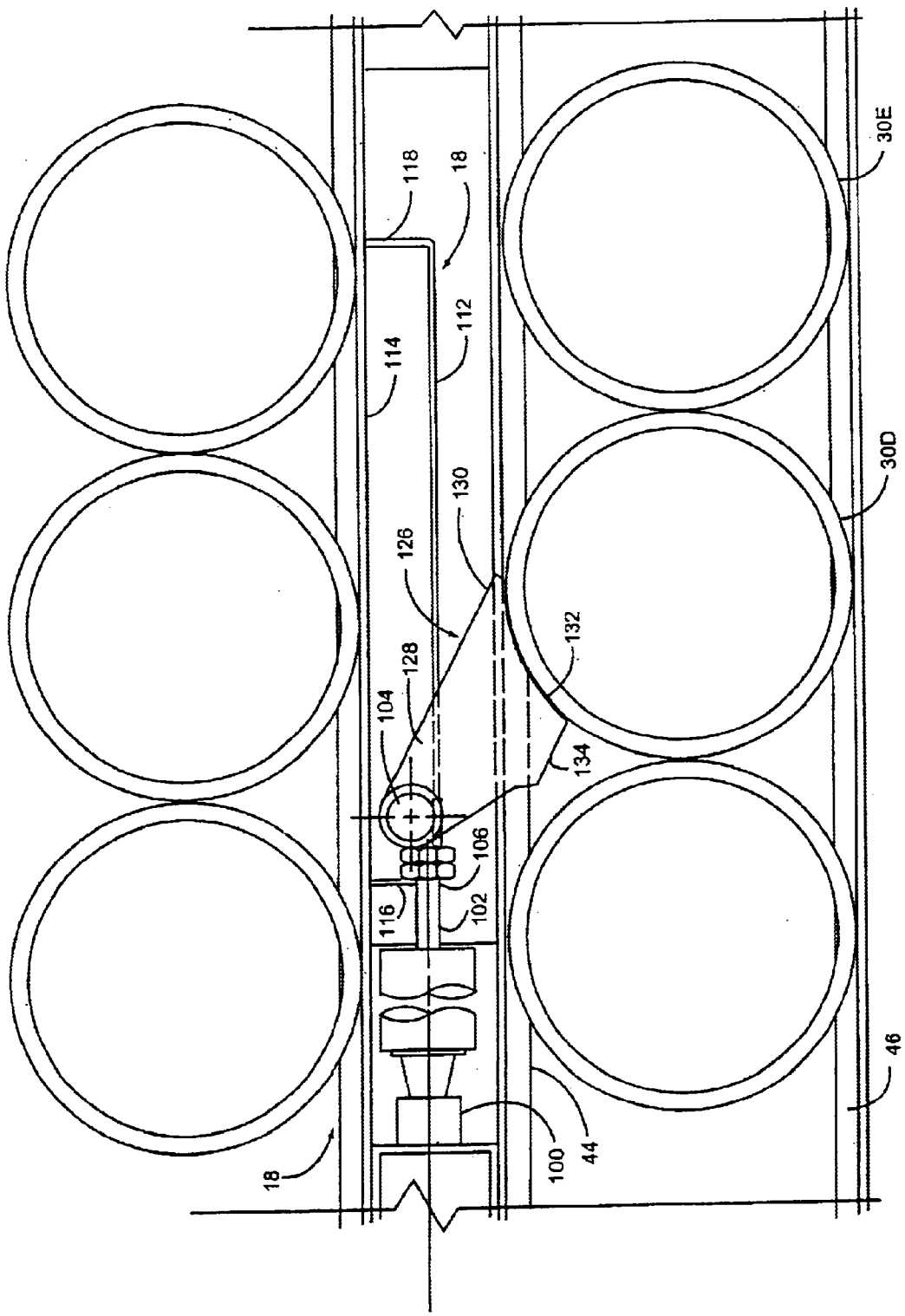
FIG. 8 is a side elevational view of the advancing assembly shown in the retracted position and the finger in the down position.
Figure 9:
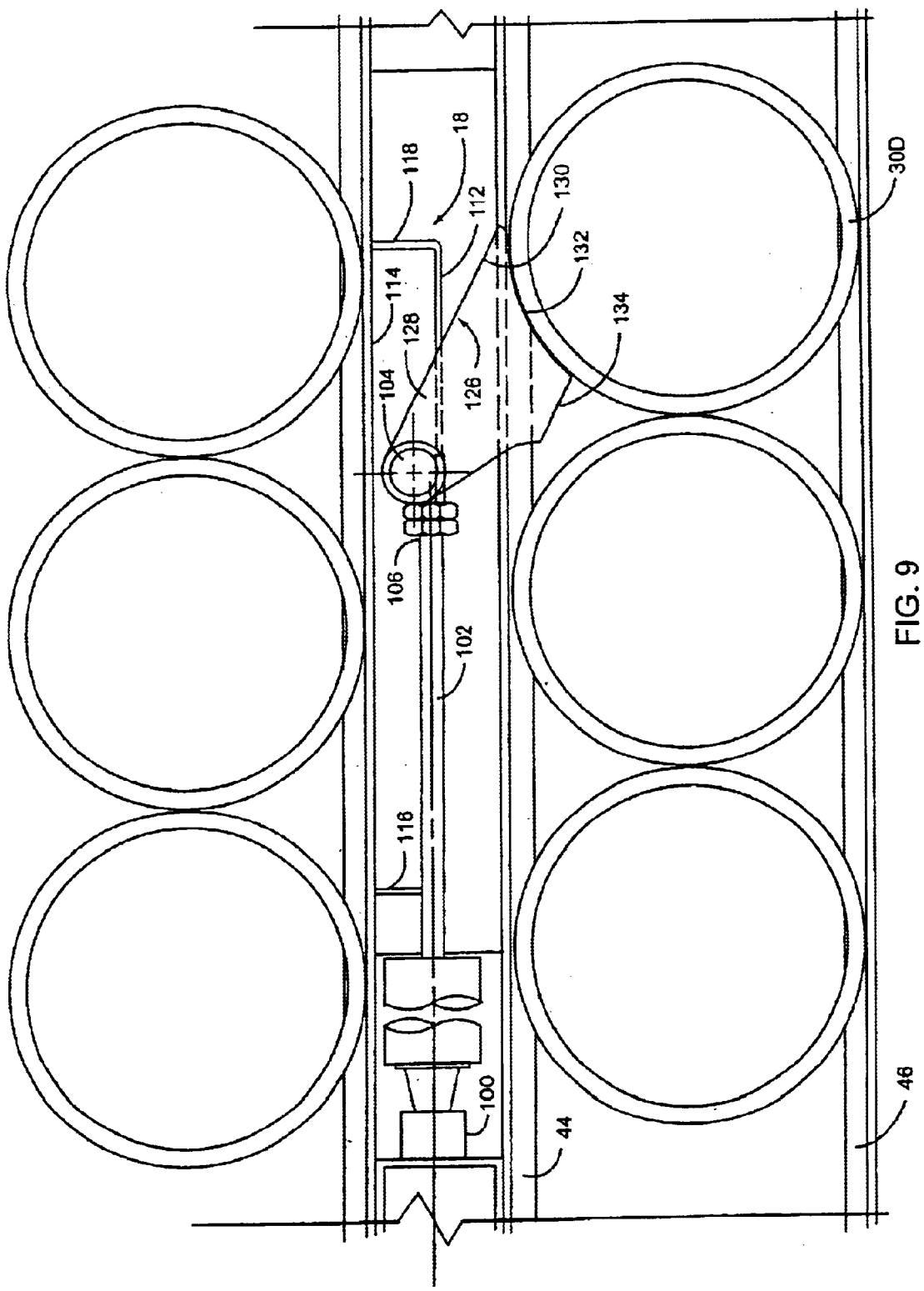
FIG. 9 is a side elevational view of the advancing assembly shown in the extended position and the finger in the down position.
Figure 10:
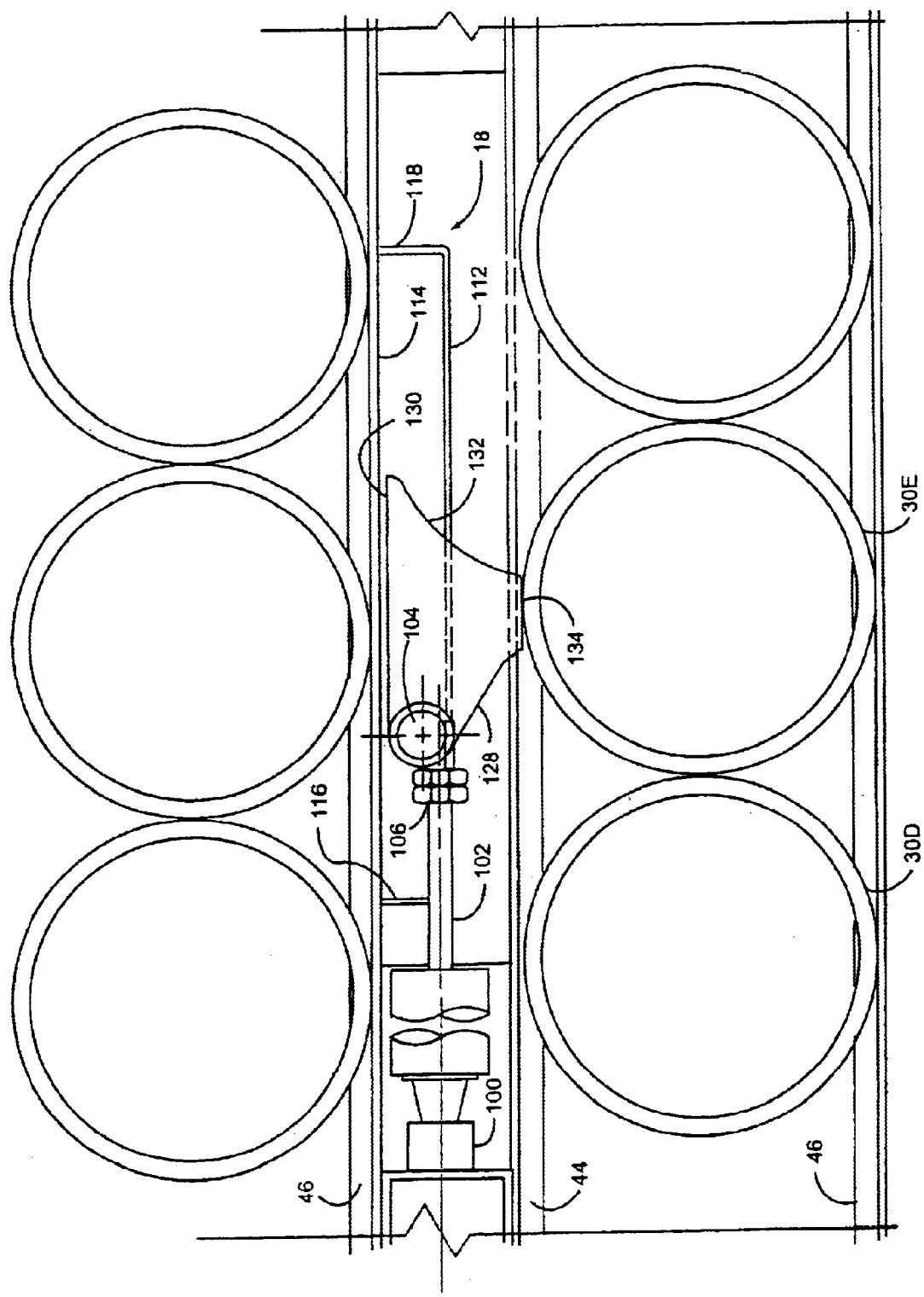
FIG. 10 is a side elevational view of the advancing assembly shown in the partially retracted position and the finger in mid-pivot up position.

FIGS. 8–10 show the movement of the advancing assembly 18. When the ram 102 is a retracted position (FIG. 8) the finger 126 is in a down position and curved section 132 engages the tube 30. As the ram 102 extends during the stroke (FIG. 9), with the bridge rod 104 sliding within the troughs 108, 110, the finger 126 urges a contact tube 30D it is in contact with forward along within the track assembly 12. The other tubes 30 are urged along the track assembly 12, as well. As the ram 102 retracts to complete the stroke cycle (FIG. 10 showing the ram 102 in mid-cycle retraction) the sleeve 124 and finger 126 pivot around the bridge rod 104 so as to pass over a tube 30E without appreciably moving the tube 30E, the bottom section 134 being able to slide over the tube 30E. Upon completion of the retraction stroke, the advancing assembly is again in position to engage another tube 30 (FIG. 8) to start the cycle over again. In this manner the tubes 30 are advanced by the advancing assembly 18 along the track assembly 12. The advancing assembly is actuated by the controller 20 by means of electronic communication, as will be discussed in greater detail hereinbelow. In a preferred embodiment a plurality of advancing assemblies 18 are utilized and are spaced along the track assembly 12 at different levels of the convolutions to provide an assist in movement of the tubes 30 in conjunction with the indexing assembly 16. It is also contemplated as part of the present invention that advancing assemblies 18 may not be needed where the overall friction or resistance of the tubes 30 is low; for example, this might be the case where the object 32 is light weight, where the tubes are constructed of a lightweight material, where the track assembly has friction reducing enhancements (such as, but not limited to, bearings, rollers, or the like or friction reducing tape or coating of the track) built in, and/or where the length of the track assembly 12 is short enough that the combined friction, weight or inertia of the tubes is low enough that the indexing assembly ram can bear the load of pushing the tubes 30 alone.

The apparatus 5 also preferably includes at least one sensor. A low load sensor 136 is mounted in proximity to the track assembly 12 and back from the dispensing assembly 14 a desired distance along the track assembly 12 and can detect whether a tube 30 contains an object 32 or is empty. The sensor 136 can thus be used to detect when the apparatus is running low on objects. A second sensor 138 can be positioned proximate to the dispensing assembly 14 to detect whether an object 32 within the present tube 30A has been successfully ejected from the tube 30A.

The controller 20 comprises a microprocessor 140 and memory 142 (not shown), a user interface 144 (not shown), and a display 146. A plurality of electrical lines (not shown) electronically connect the controller 20 with the rams 54, 64, 102 and sensors 136 and 138.

FIGS. 11–13 show various aspects of the user interface 144 and display 146. The controller 20 can control start/stop commands, controlling speed of incrementing and dispensing, counting bags, duty cycle calculation, and alerts. FIG. 11 shows a screen having power on/off button 150 and low object (for example a fiber bag) alarm 152 and display 146. The display has areas for current count 154, count set point 156, reset cycle 158, cycle complete 159, cycle stopped 160, cycle in progress 161, start 162, stop 164, clock 166, index off 168, eject off 170 and next screen 172. Other of different display areas can be incorporated as known to those skilled in the art. FIG. 12 shows a screen having an index delay 174, eject delay 176, index off 168, eject off 170, reset total count 178, total count 180, previous screen 182 and next screen 172. FIG. 13 shows a screen having a clock 166, increment hour 184, decrement hour 186 and previous screen 182. Optionally, a sound generator can signal an audible alert for occurrence of predefined events, such as, but not limited to, low object count, system jam, failure to eject an object, failure to detect an object, and the like.

In operation of the apparatus 5 in an example of a preferred embodiment of the present invention in which the objects 32 are bags of compressed fibers for dispensing into a concrete mixer, the on/off button 150 is activated to power up the apparatus 5. The required bag number is entered in count set point 156. Reset cycle 158 is actuated and then start 162 is actuated. The ram 54 is actuated to extend and eject a bag from the present tube 30A that is positioned in the dispensing assembly 14. The sensor 136 detects the ejection of the bag and signals the controller that a bag has been ejected. The indexing assembly ram 64 then strokes forward, and the scoop 68 engages and pushes the present tube 30A along the track assembly 12. At the same time the ratchet fingers 82, 84 (if a plurality of fingers are used) pivot upward about the axis of the bar 88 in response to the lateral movement of the present tube 30A. As the ram 64 strokes forward the plate 72 moves in position below the next tube 30C to block the tube 30C from contacting the ram 64. At the same time the advancing assemblies 18 commence a stroke cycle whereby the ram 102 extends so that the fingers 126 push a tube 30D along the track assembly 12. At the same time during this process a next tube 30C drops onto the plate 72.

The indexing ram 64 then strokes backward, retracting the indexing assembly 16 ram 64 and the fingers 82, 84 engage the now last tube 30B (which was the present tube 30A) to prevent the tubes 30 from rolling back toward the dispensing assembly 14. At the same time the advancing assembly ram 102 is retracted the fingers 126 pivot upward and over the next tube 30E. When the dispensing assembly ram 54 is retracted, the next tube 30C drops into the dispensing assembly 14 and is ready for ejection from the tube, thus completing the cycle. The cycle automatically repeats until the count set point number is reached, at which time the apparatus 5 cycling is stopped and/or an alert is signaled.

When the objects 32 are dispensed, they may drop into a desired environment, or conveyed to an end environment. In the example of fiber bags being used in a concrete mixer, the bags dispensed by the apparatus 5 of the present invention go onto a conventional conveyor, vacuum tube apparatus or other transport system and are delivered to the mixer, typically in conjunction with other concrete components.

In an alternative embodiment, where a plurality of objects within a single tube 30 are desired to be dispensed in sequence, the tube 30 can be divided into longitudinal compartments and an object 32 reside within each compartment. The dispensing assembly can be adapted to have a plurality of rams in parallel that eject each object in each compartment in a controlled sequence. This might be an advantageous embodiment where each compartment holds a component that must be dispensed in a particular sequence, but cannot be mixed beforehand. The compartments can be adapted to hold fluids or semi-fluids, for example, paint, in tubes whereby the contents can be pushed by a ram and dispensed, similar to a caulking gun dispensing caulk from a tube by forcing the bottom of the tube toward the tip.

Figure 17:
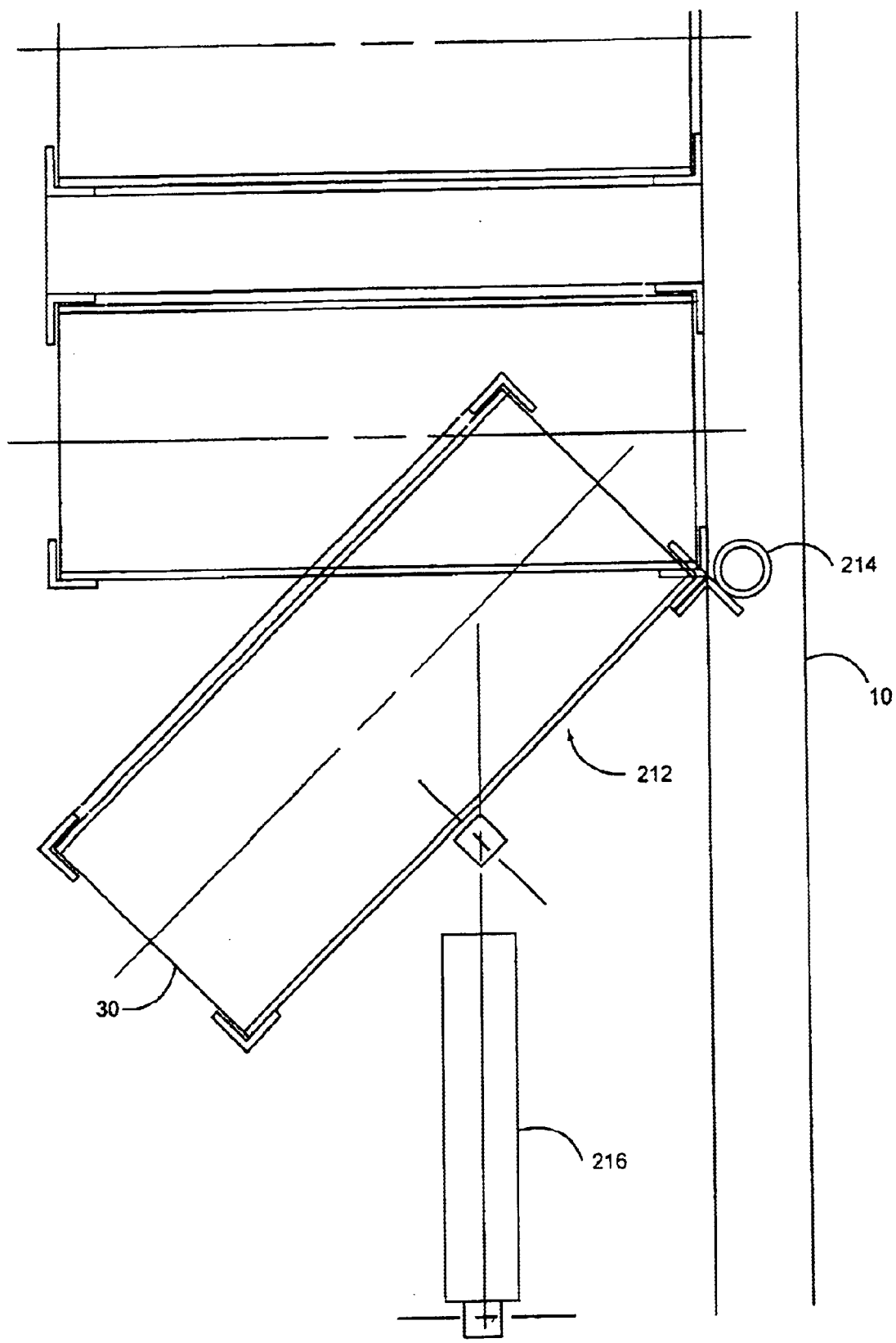

In an alternative embodiment of the dispensing assembly, a dispensing assembly 200 is shown in FIGS. 14–17, whereby the ram 54 is replaced with a tube containment assembly 210, which comprises a frame 212 to contain the tube 30 from which an object (not shown) is to be dispensed. The frame 212 is open at the top to accept a tube 30 and has a tab 211 extending from the bottom. The frame 212 is supported at a pivot point 214 which is controlled by a ram 216 so that when dispensing the object 32, the ram 216 retracts in response to a signal from the controller 20, causing the containment assembly 210 to drop downward to an inclined or vertical direction (as shown in FIG. 17) to dispense the object 32. A secondary indexing assembly 230 assists in retaining a next tube 30C in position above the present tube 30A and the frame 212 until the object 32 in the present tube 30A is dispensed and moved laterally by the ram 64 along the track assembly 12. The secondary indexing assembly 230 comprises a pneumatic cylinder 232 attached to a ram 234. A plate or strip 236 of rigid material is attached to the ram 234 distal end 238. A plate 240 is attached to the plate 236 in a perpendicular orientation so that the plate 240 is generally parallel to and in proximity to the plate 72.

Figure 14:
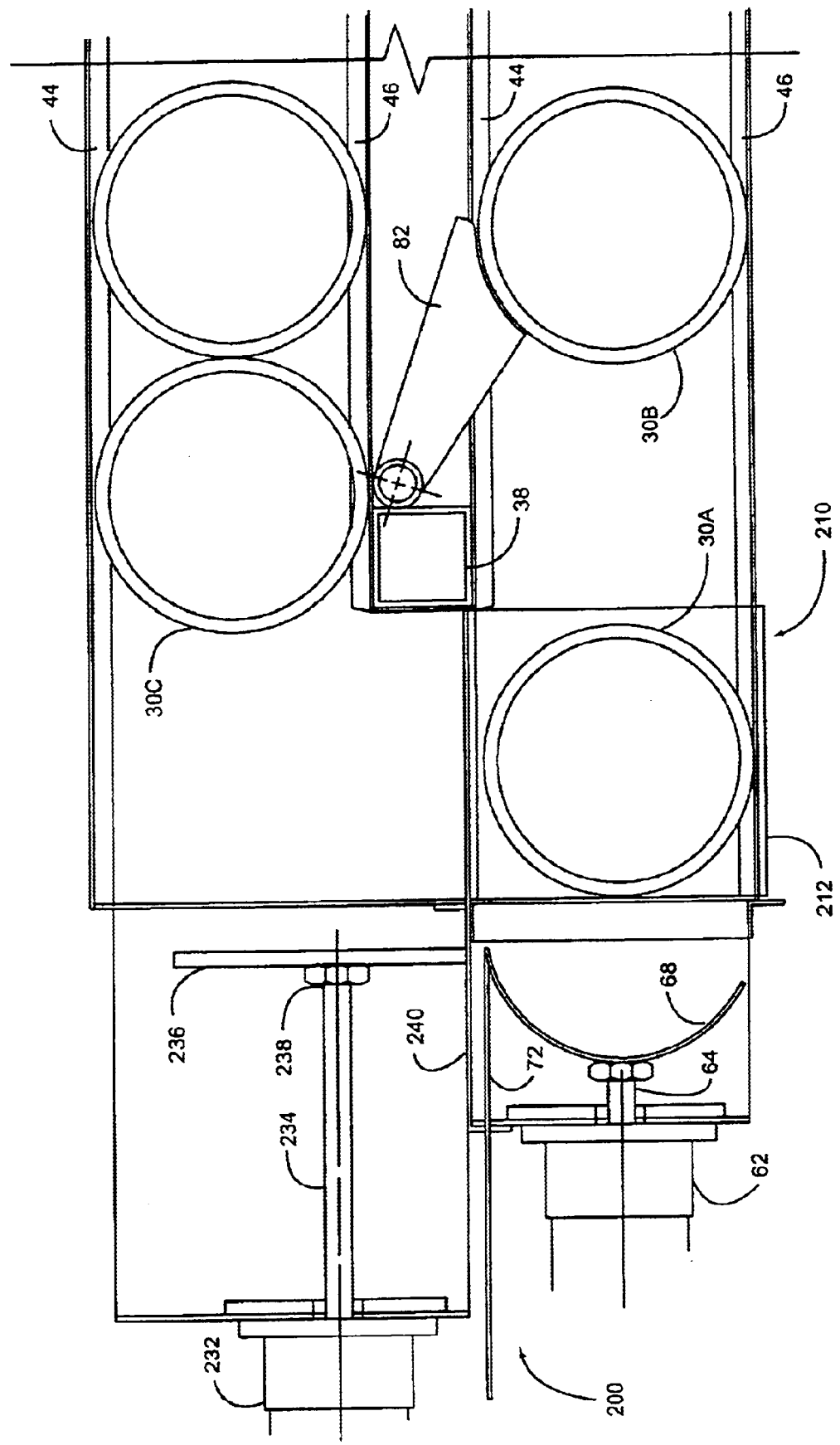
FIGS. 14–17 are various views of an alternative embodiment of the dispensing assembly.
Figure 15:
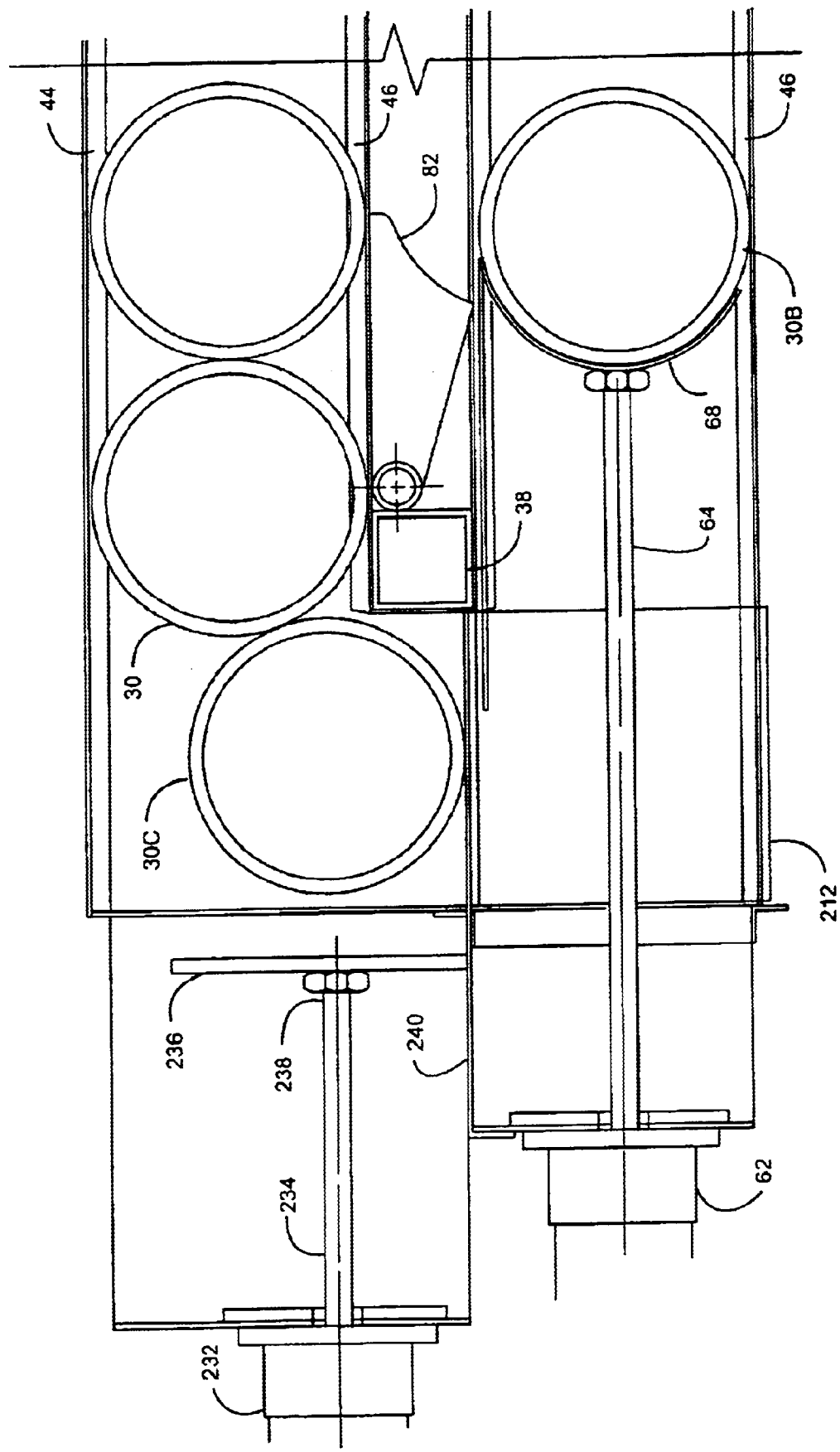
Figure 16:
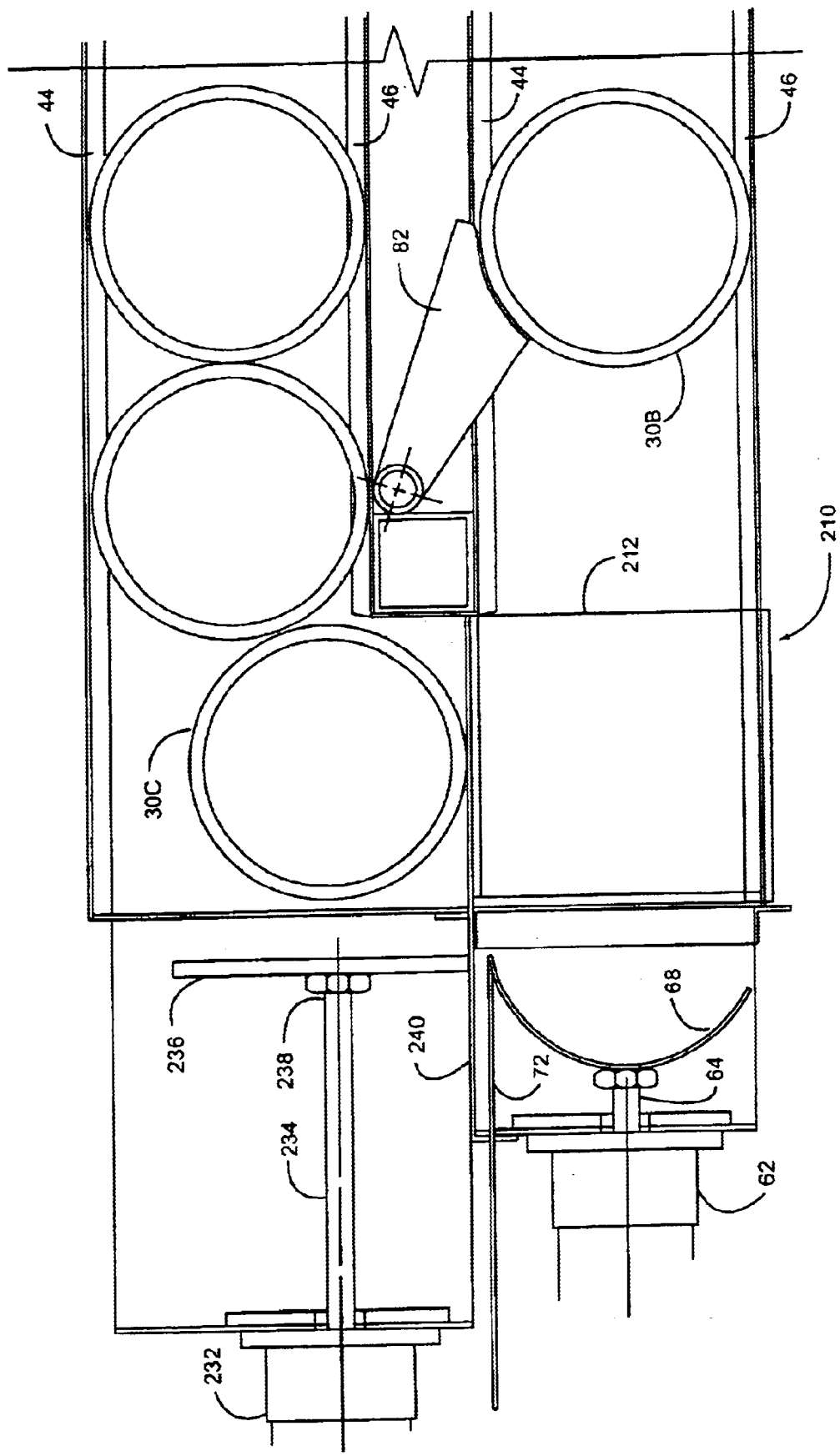

In operation of this alternative embodiment, a tube 30A (as shown in FIG. 14) is in place in the assembly 210. The controller 20 signals the ram 216 to retract, causing the assembly 210 to pivot and dispense the object 32 contained in the tube 30A. The ram 216 then extends to pivot the assembly 210 back to the horizontal position and thus ready to accept another tube.

The ram 64 then is actuated, which moves the tube 30A down the track assembly 12 and also causes the plate 72 to move laterally toward the ratchet assembly 80. At the same time, the ram 234 is actuated in response to a signal from the controller 20 and extends toward the ratchet assembly, causing the plate 240 to move accordingly (see FIG. 15). The plates 72 and 240 are thereby in position to block the next tube 30C from falling into the assembly 210 until ready. As the ram 64 pushes the tube 30A the other tubes 30 advance accordingly and a next tube 30C is pushed into position over the assembly 210 and on top of the plate 240 (see FIG. 16). The ram 64 and the ram 234 retract, causing the plate 72 and the plate 240 to slide away from the ratchet assembly 80 and permit the next tube 30C to drop into the assembly 210, thus completing the cycle.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. It should further be noted that any patents, applications and publications referred to herein are incorporated by reference in their entirety.

What is claimed is:

1. An apparatus for dispensing objects, each object contained in a transport tube, comprising:
   a) a housing comprising a frame;
   b) a track assembly for holding a plurality of tubes;
   c) a dispensing assembly, comprising
      i) a first ram for pushing one said object from said tube,
      ii) a second ram for moving one said tube from a first position to a second position while preventing other tubes from interfering with said moving;
   d) an indexing assembly for controllably permitting one tube at a time to move in response to movement from said second ram; and,
   e) a controller for controlling said dispensing assembly.

2. An apparatus for dispensing objects, each object contained in a transport tube, comprising:
   a) a housing comprising a frame and a rollup access panel;
   b) a track assembly for holding a plurality of tubes, said track assembly comprising a pair of parallel spaced apart lengths of a rigid material arranged in a convoluted space;
   c) a dispensing assembly, comprising,
      i) a first ram for pushing one said object from said tube, said ram having a distal end terminating in a disk associated therewith,
      ii) a first powered cylinder for actuating said first ram;
   d) an advancing assembly for controllably permitting one tube at a time to advance to said dispensing assembly, comprising,
      i) a second ram having a distal end terminating in a curved section for holding a tube for moving one said tube from a first position to a second position along said track assembly;
      ii) a generally flat horizontal plate associated and reciprocating with said first ram for preventing tubes disposed above said dispensing assembly from prematurely entering said dispensing assembly when said first ram is extending;
      iii) a second powered cylinder for actuating said second ram,
   e) an indexing assembly for preventing movement of said tubes in a reverse direction, comprising,
      i) a first arm having a curved portion for releasably engaging a portion of a tube,
      ii) a second arm having a curved portion for releasably engaging a portion of a tube,
      iii) a rod connecting and maintaining said first and second arms in a generally parallel spaced apart relationship,
      iv) at least one rod in which said sleeve is rotatingly disposed, said at least one rod associated with said frame;
   f) at least one tube advancing assembly, comprising,
      i) a third ram,
      ii) a third powered cylinder,
      iii) a rocker bar having at least one third arm having a curved portion for releasably engaging a portion of a tube
      iv) at least one sleeve in which said rocker bar is at least partially disposed,
      v) a trough associated with said track assembly in which said rocker bar can reciprocatingly translate,
   g) means for controlling said dispensing assembly comprising a microprocessor; and,
   h) at least one sensor for detecting the presence of at least one of said objects.

* * * * *